United States Patent
Oh et al.

(10) Patent No.: US 7,663,478 B2
(45) Date of Patent: Feb. 16, 2010

(54) MOUNTING SYSTEM ADAPTED TO EXTEND AND RETRACT TO PIVOT A MONITOR

(75) Inventors: Sung I. Oh, West Covina, CA (US); Hang-Koo Yeo, Kyunggido (KR)

(73) Assignee: CLO Systems, LLC, City of Industry, CA (US)

( * ) Notice: Subject to any disclaimer, the term of this patent is extended or adjusted under 35 U.S.C. 154(b) by 0 days.

(21) Appl. No.: 11/876,786

(22) Filed: Oct. 23, 2007

(65) Prior Publication Data
US 2008/0156953 A1 Jul. 3, 2008

Related U.S. Application Data

(63) Continuation of application No. 11/899,046, filed on Sep. 4, 2007.

(60) Provisional application No. 60/853,819, filed on Oct. 23, 2006, provisional application No. 60/859,464, filed on Nov. 15, 2006, provisional application No. 60/876,768, filed on Dec. 22, 2006, provisional application No. 60/879,091, filed on Jan. 4, 2007, provisional application No. 60/923,599, filed on Apr. 14, 2007.

(51) Int. Cl.
G08B 23/00 (2006.01)

(52) U.S. Cl. .................... 340/500; 340/384.1

(58) Field of Classification Search .............. 340/384.1, 340/384.5, 500, 539.14, 539.19, 539.24, 340/FOR. 106
See application file for complete search history.

(56) References Cited

U.S. PATENT DOCUMENTS

| 4,025,053 | A |   | 5/1977  | Stickle, Jr. |
|-----------|---|---|---------|--------------|
| 4,203,636 | A |   | 5/1980  | Wells |
| 4,609,982 | A | * | 9/1986  | Gohda ......................... 363/89 |
| 4,712,653 | A |   | 12/1987 | Franklin et al. |
| 4,720,805 | A |   | 1/1988  | Vye |
| 5,124,805 | A |   | 6/1992  | Chung et al. |
| 5,261,645 | A |   | 11/1993 | Huffman |
| 5,321,579 | A |   | 6/1994  | Brown et al. |
| 5,366,203 | A |   | 11/1994 | Huffman |
| 5,474,376 | A |   | 12/1995 | Saunders |
| 5,525,019 | A |   | 6/1996  | Moore et al. |
| 5,592,724 | A |   | 1/1997  | Linville et al. |
| 5,618,995 | A |   | 4/1997  | Otto et al. |

(Continued)

FOREIGN PATENT DOCUMENTS

CH         653 464 A5    12/1985

(Continued)

OTHER PUBLICATIONS

Dave Coleman—Sport Compact Car Technobabble: Multilink and the Beam, published Nov. 1998.

(Continued)

*Primary Examiner*—Alfred Joseph Wujciak, III

(57) ABSTRACT

A mount system for a monitor extends and retracts the monitor. The mount system includes a first arm pivotably coupled to a second arm so that that the monitor extends and retracts in a substantially straight line. One or more motors may be incorporated into the mount system to adjust the viewing angle of the monitor through a remote control.

9 Claims, 14 Drawing Sheets

U.S. PATENT DOCUMENTS

| | | | |
|---|---|---|---|
| 5,634,622 A | 6/1997 | Pye |
| 5,668,570 A | 9/1997 | Ditzik |
| 5,694,864 A | 12/1997 | Langewellpott |
| 5,715,138 A | 2/1998 | Choi |
| 6,095,476 A | 8/2000 | Mathis |
| 6,109,395 A | 8/2000 | Storm |
| 6,149,253 A | 11/2000 | Talasani |
| 6,170,408 B1 | 1/2001 | Gombrich |
| 6,186,279 B1 | 2/2001 | Blocker |
| 6,257,372 B1 | 7/2001 | Schirmer |
| 6,357,768 B1 | 3/2002 | Chan et al. |
| 6,402,109 B1 | 6/2002 | Dittmer |
| 6,484,993 B2 | 11/2002 | Huffman |
| 6,526,611 B2 | 3/2003 | Flynn et al. |
| 6,532,147 B1 | 3/2003 | Christ, Jr. |
| 6,554,242 B2 | 4/2003 | Kim |
| 6,586,854 B1 | 7/2003 | Nozawa et al. |
| 6,604,722 B1 | 8/2003 | Tan |
| 6,615,551 B2 | 9/2003 | Chesser et al. |
| 6,619,960 B1 | 9/2003 | Horn |
| 6,633,276 B1 | 10/2003 | Jaynes |
| 6,633,286 B1 | 10/2003 | Do et al. |
| 6,637,818 B2 | 10/2003 | Williams |
| 6,655,645 B1 | 12/2003 | Lu et al. |
| 6,679,479 B1 | 1/2004 | Watkins |
| 7,317,611 B2 | 1/2008 | Dittmer |
| 2003/0080949 A1 | 5/2003 | Ditzik |
| 2004/0075970 A1 | 4/2004 | Einhorn et al. |
| 2004/0211870 A1 | 10/2004 | Bremmon et al. |
| 2005/0110911 A1 | 5/2005 | Childrey et al. |
| 2007/0009119 A1* | 1/2007 | Kim ..................... 381/306 |
| 2008/0054147 A1 | 3/2008 | Muday et al. |
| 2008/0105807 A1 | 5/2008 | Oh |
| 2008/0156953 A1 | 7/2008 | Oh et al. |

FOREIGN PATENT DOCUMENTS

| | | |
|---|---|---|
| DE | 102 24 764 A1 | 12/2002 |
| GB | 2 370 171 A | 6/2002 |
| JP | 08 312885 A | 11/1996 |
| KR | 10-20040070521 A | 8/2004 |
| KR | 10-2005-0080139 A | 8/2005 |
| KR | 10-2005-0083030 A | 8/2005 |
| WO | WO2004051991 A | 6/2004 |

OTHER PUBLICATIONS

Whee-Kuk Kim and Byung Ju Yi—Analysis of Parallel Mechanisms with Forward Position Closed-Form Solution with Application to Hybrid Manipulator, published 1999.

Erard Motion—www.erard.com, no publication date.

INCA Corporation—"Plasma TV Motorized Wall Mounted Automatic Swivel with Tilt," no pub. date.

Future Automation—www.futureautomation.co.uk, Motorized Mount "MOT42/50", published Apr. 27, 2005.

Title "Mechanism" from http://mysite.du.edu/~jcalvert/tech/machines/centro.htm, by J.B. Calvert. The above titled Mechanism first created Dec. 24, 2003; and revised Dec. 2, 2005; see p. 6.

* cited by examiner

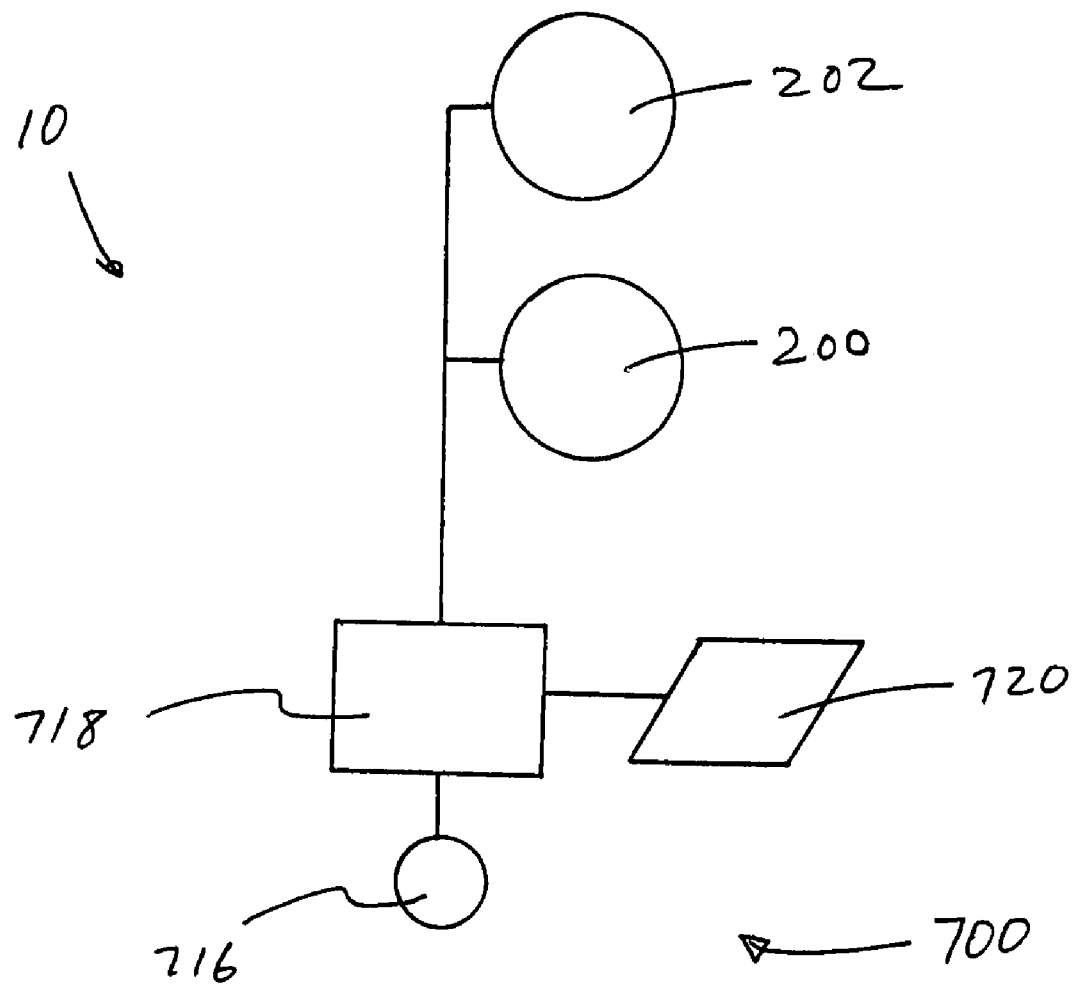
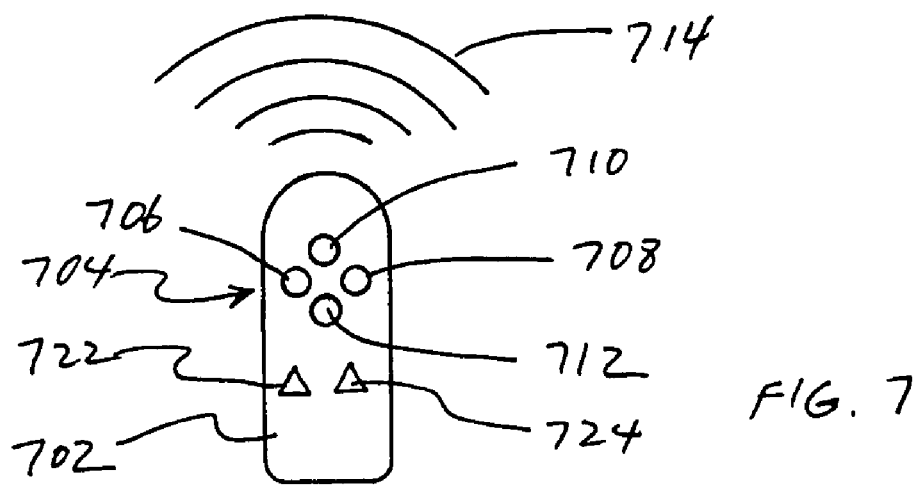
FIG. 7

MOUNTING SYSTEM ADAPTED TO EXTEND AND RETRACT TO PIVOT A MONITOR

RELATED APPLICATIONS

This application claims priority five U.S. provisional patent application Ser. Nos. (1) 60/853,819, filed Oct. 23, 2006; (2) 60/859,464, filed Nov. 15, 2006; (3) 60/876,768, filed Dec. 22, 2006; (4) 60/879,091, filed Jan. 4, 2007; and (5) 60/923,599, filed Apr. 14, 2007, which are all incorporated by references. This application is also continuation of U.S. patent application Ser. No. 11/899,046, filed Sep. 4, 2007, which is hereby incorporated by reference.

BACKGROUND

1. Field of the Invention

This invention is directed to a mount system that is adapted to couple to a back side of a monitor, and extend and retract one side of the monitor to pivot the monitor relative to a reference plane.

2. Background of the Invention

Flat panel monitors such as computer monitors, LCD, plasma, slim televisions, and the like (collectively referred to as "monitor(s)") are becoming popular because they can be mounted onto a wall to save floor space and for their aesthetically pleasing appearance. In many applications, a monitor is attached to a wall with a mount bracket between the monitor and the wall. In order to reposition the monitor, an articulating mount is used to attach the monitor to the wall. The articulating mounts that are available today, however, are difficult to use because they have a tendency to move laterally left and right rather than moving straight in and out of the wall as the monitor is pushed and pulled, respectively. In situations where the monitor is recessed into a wall or a cabinet, the lateral movement of the monitor adds to the difficulty of extending and retracting the monitor from its recessed position. Moreover, with manual mounts, in order to reposition the monitor, the viewer needs to walk over to the monitor and physically move the monitor to a new position. Accordingly, there is a need to be able to extend and retract a monitor substantially straight or perpendicularly from the wall.

INVENTION SUMMARY

This invention is directed to a mount system adapted to extend and retract a monitor from the wall. The mount system includes a first guiding member having a longitudinal axis; a first arm having a first proximal end and a first distal end, the first proximal end adapted to pivot along a first pivot axis and move along the longitudinal axis of the first guiding member, the first distal end having a second pivot axis, and the first distal end adapted to couple to the back side of the monitor and pivot the monitor along the second pivot axis; and a second arm having a second proximal end and a second distal end, the second proximal end adapted to pivot about a third pivot axis, the third pivot axis being in a fixed position, and the second distal end adapted to pivotably couple to the first arm about a fourth pivot axis located between the first proximal end and the first distal end such that the first distal end extends and retracts relative to the second proximal end. The mount system may include one or more motors to reposition the monitor through a remote control.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 shows a control system of the mount system.

DETAILED DESCRIPTION OF THE INVENTION

Figure 1:
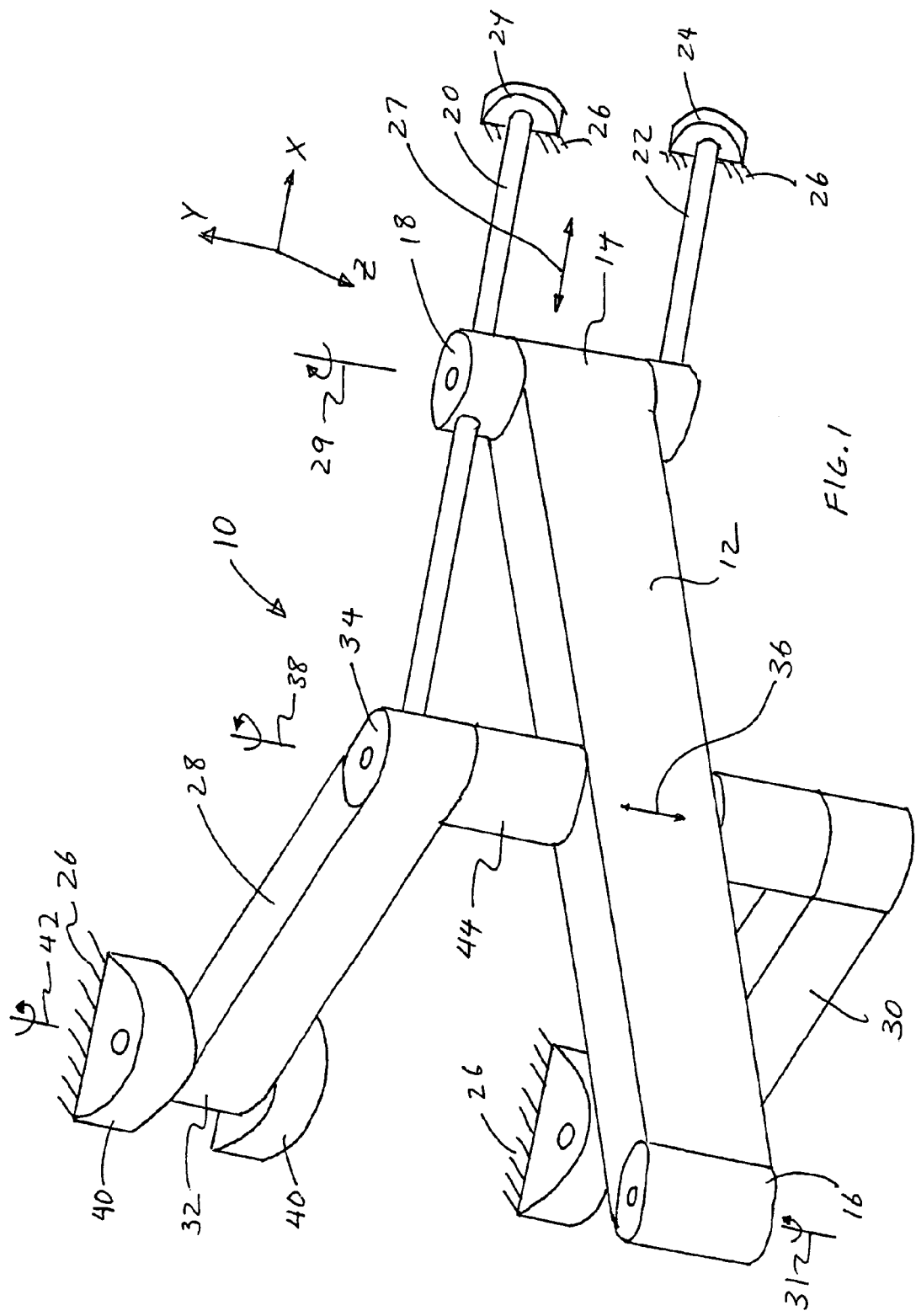
FIG. 1 shows a perspective view of a mount system along X, Y, and Z coordinates.

FIG. 1 shows a perspective view of a mount system 10 in reference to X, Y, and Z coordinates. The mount system 10 includes a first arm 12 having a proximal end 14 and a distal end 16. The proximal end 14 may be pivotably coupled to a sleeve 18 adapted to move along one or more guiding members 20 and 22. The two ends of the guiding members 20 and 22 may be supported by first set of anchors 24, which are attached to a base plate 26. This allows the distal end 14 to move along a longitudinal axis 27 of the guiding members 20 and 24 and pivot about a pivot axis 29. The distal end 16 has a pivot axis 31 that is adapted to couple to the back side of the monitor, which will be described in more detail below.

The mount system 10 may include a second arm 28 and a third arm 30. The second arm 28 may be a mirror image of the third arm 30 so that only the second arm 28 will be discussed in detail in this specification. The first arm 12 may be provided between the second and third arms 28 and 30. The second arm 28 may have a proximal end 32 and a distal end 34. The distal end 34 may be pivotably coupled to the first arm 12 along a midpoint 36 between the proximal end 14 and the distal end 16. This allows the distal end 34 to pivot about a pivot axis 38, which is substantially aligned with the midpoint 36. The proximal end 32 may be pivotably coupled to the base plate 26 through second set of anchors 40. This allows the proximal end 32 to pivot about a pivot axis 42. A spacer 44 may be provided between the first and second arms 12 and 28 to provide a gap between the two arms.

The first and second arms 12 and 28 may be sized so that the distance between the pivot axes 29 and 31 is about two times the distance between the pivot axes 28 and 42. With the pivot axis 38 substantially along the midpoint between the pivot axes 29 and 31, the pivot axis 31 may extend and retract substantially perpendicular relative to the base plate 26. Note that the two guiding members 20 and 22 support the weight of the monitor attached to the distal end 16. Moreover, the second and third arms 28 and 30 support the first arm 12 about its center to support the weight of the monitor to minimize the distal end 16 from sagging due to the weight of the monitor.

Figure 2:
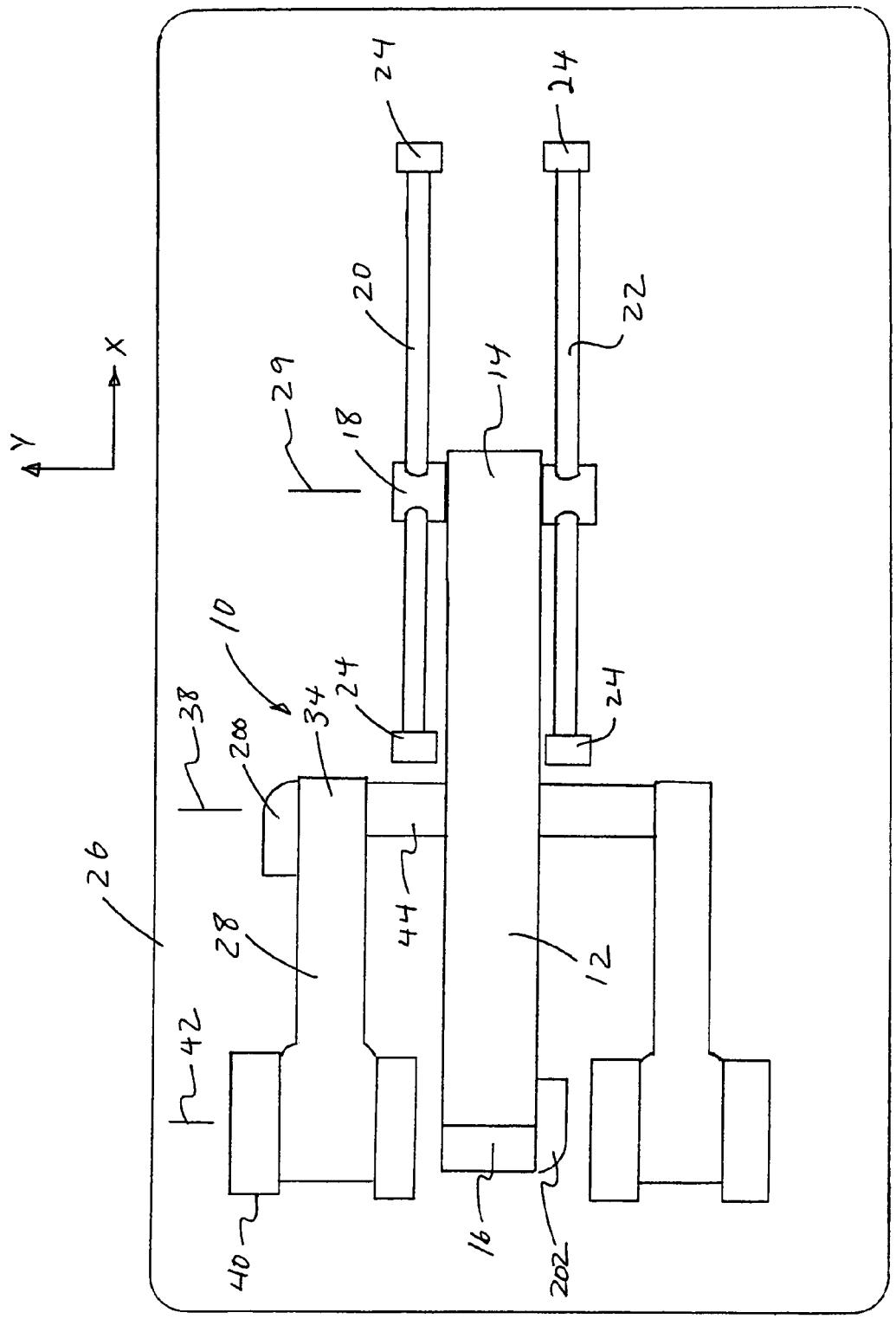
FIG. 2 shows a view of the mount system of FIG. 1 along a XY plane.

FIG. 2 shows the mount system 10 along the XY coordinates. In this example, negative (−)Y axis may represent the direction of the gravitational force. It is within the scope of this invention to have the gravitational force along other axis such as X or Z, in either in the positive or negative direction. The mount system 10 may be manually operated or automated. To extend and retract mount system 10 through a motorized action, one or more motors may be provided along the pivot axes 29, 38 and/or 42. For example, FIG. 2 show a first motor 200 coupled to the distal end 34 of the second arm 28 to pivot the second arm 28 relative to the first arm 12 along the pivot axis 38. This causes the proximal end 14 to slide along the guiding members 20 and 22 and the second arm 28 to pivot along the pivot axis 42, which in turn causes the distal end 16 to extend or retract relative to the pivot axis 42 substantially along a straight line or perpendicularly relative to the base plate 26.

FIG. 2 shows a second motor 202 coupled to the distal end 16 of the first arm 12. The distal end may be adapted to couple to a back side of a monitor, as discussed in more detail below, and activating the second motor 202 may cause the monitor to swivel left and right. Note that the length of the two guiding members 20 and 22 may be shortened so that they are less than half (½) the distance of the first arm 12. This allows the first arm 12 to fully retract against the base plate 26 so that the depth of the mount system 10 may be minimized.

Figure 3:
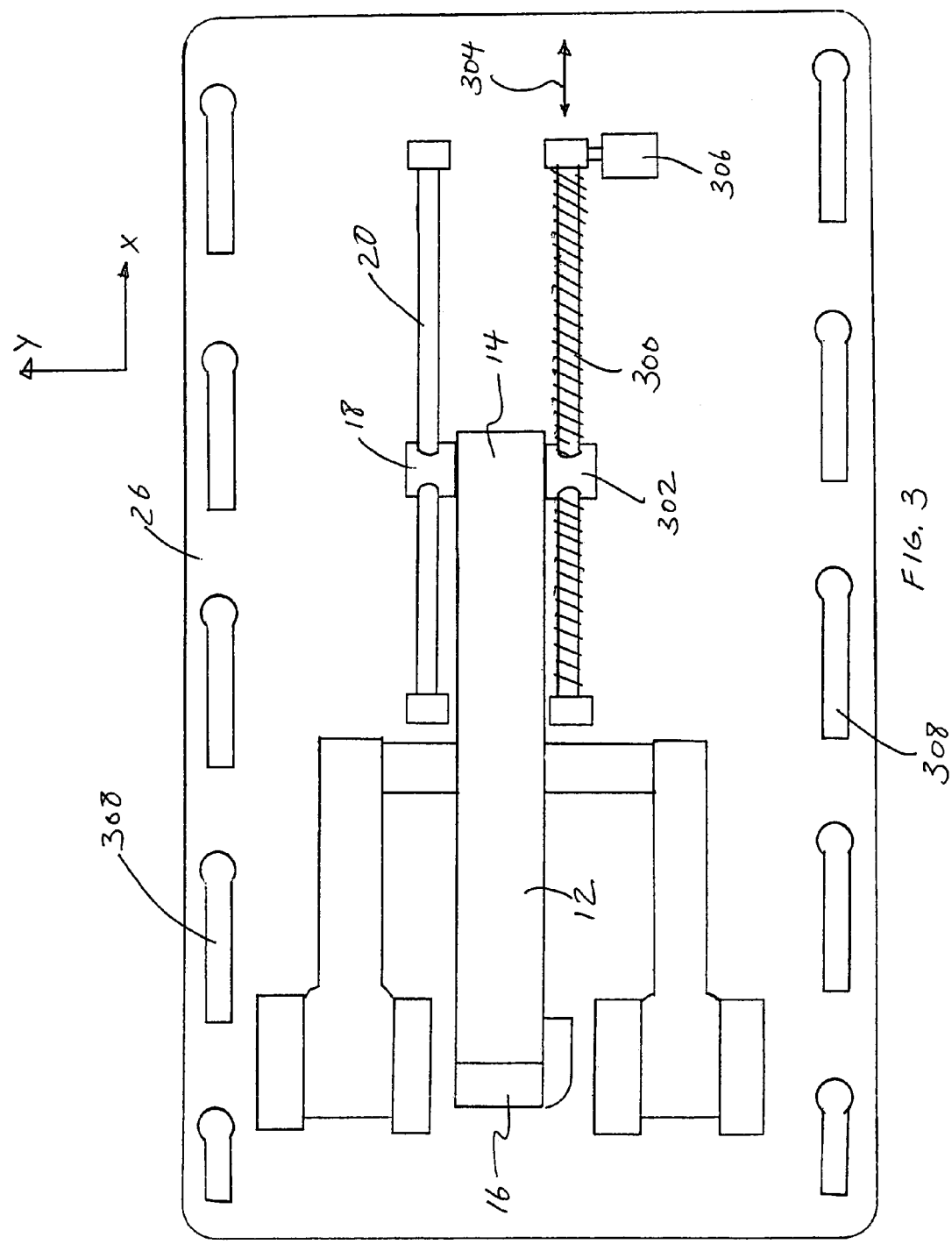
FIG. 3 shows another embodiment of the mount system of FIG. 1 along a XY plane.

FIG. 3 shows an alternative embodiment to extend and retract the distal end 16 of the first arm 12. In this example, a screw 300 may be provided in place of the one of the guiding members 20 and 22. The sleeve 302 may have a threaded opening adapted to receive the screw 300. A motor 306 may be coupled to the screw 300 to rotate the screw 300, which in turn causes the sleeve 302 to move along the longitudinal axis 304 of the screw 300. This causes the proximal end 14 to slide or move along the longitudinal axis 304 of the screw 300, which in turn causes the distal end 16 to extend and retract as discussed above. A number of openings 308 may be provided on the base plate 26 to attach the base plate 26 to a wall.

Figure 4:
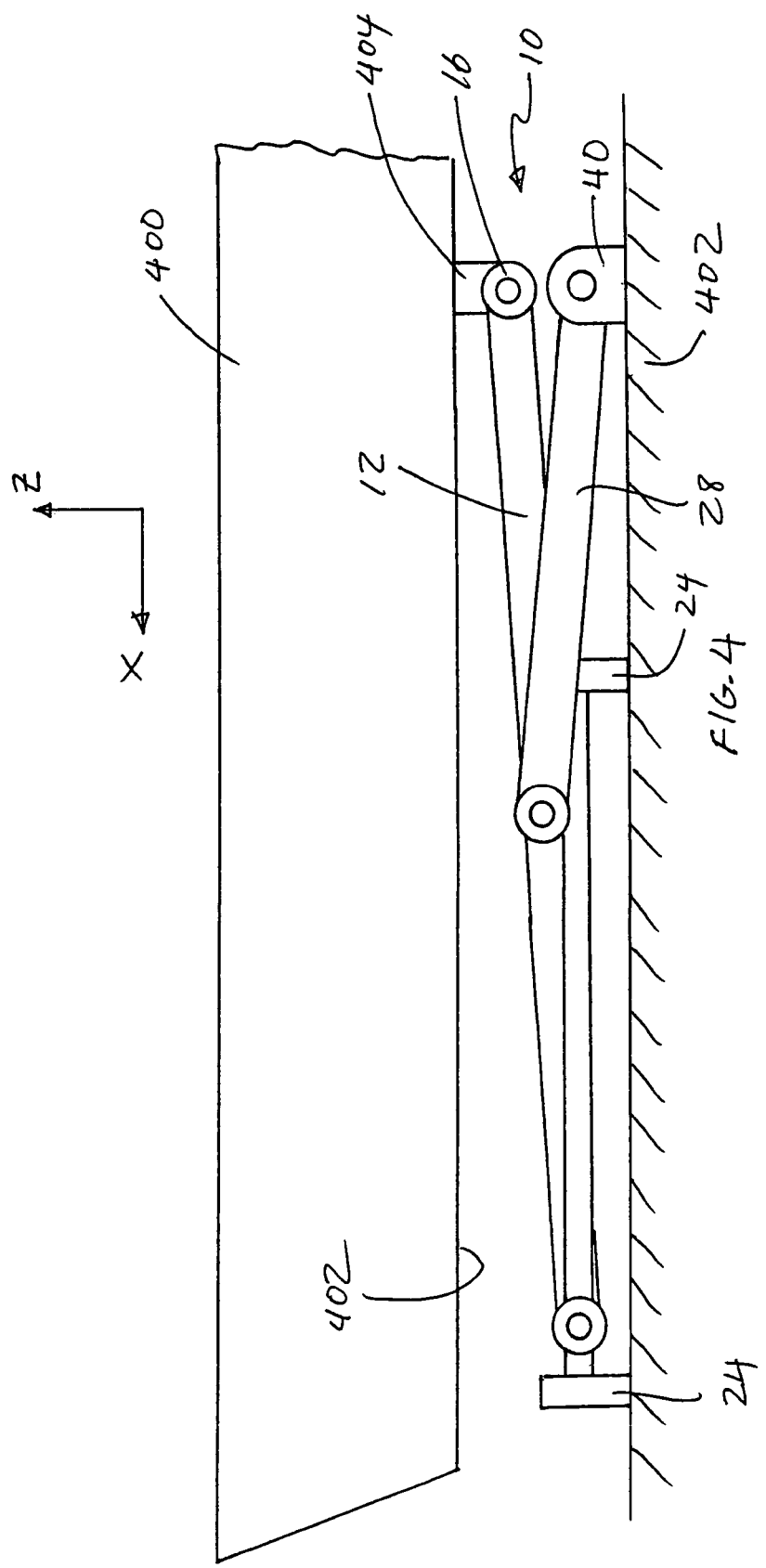
FIG. 4 shows a view of the mount system of FIG. 1 along a XZ plane.

FIG. 4 shows the mount system 10 in a retracted position between a monitor 400 and a wall 402 along XZ plane. In this example, the negative (−)Y axis may represent the direction of the gravitational force. A bracket 404 may be provided to attach the back side 402 of the monitor 400 to the distal end 16 of the first arm 12.

Figure 5:
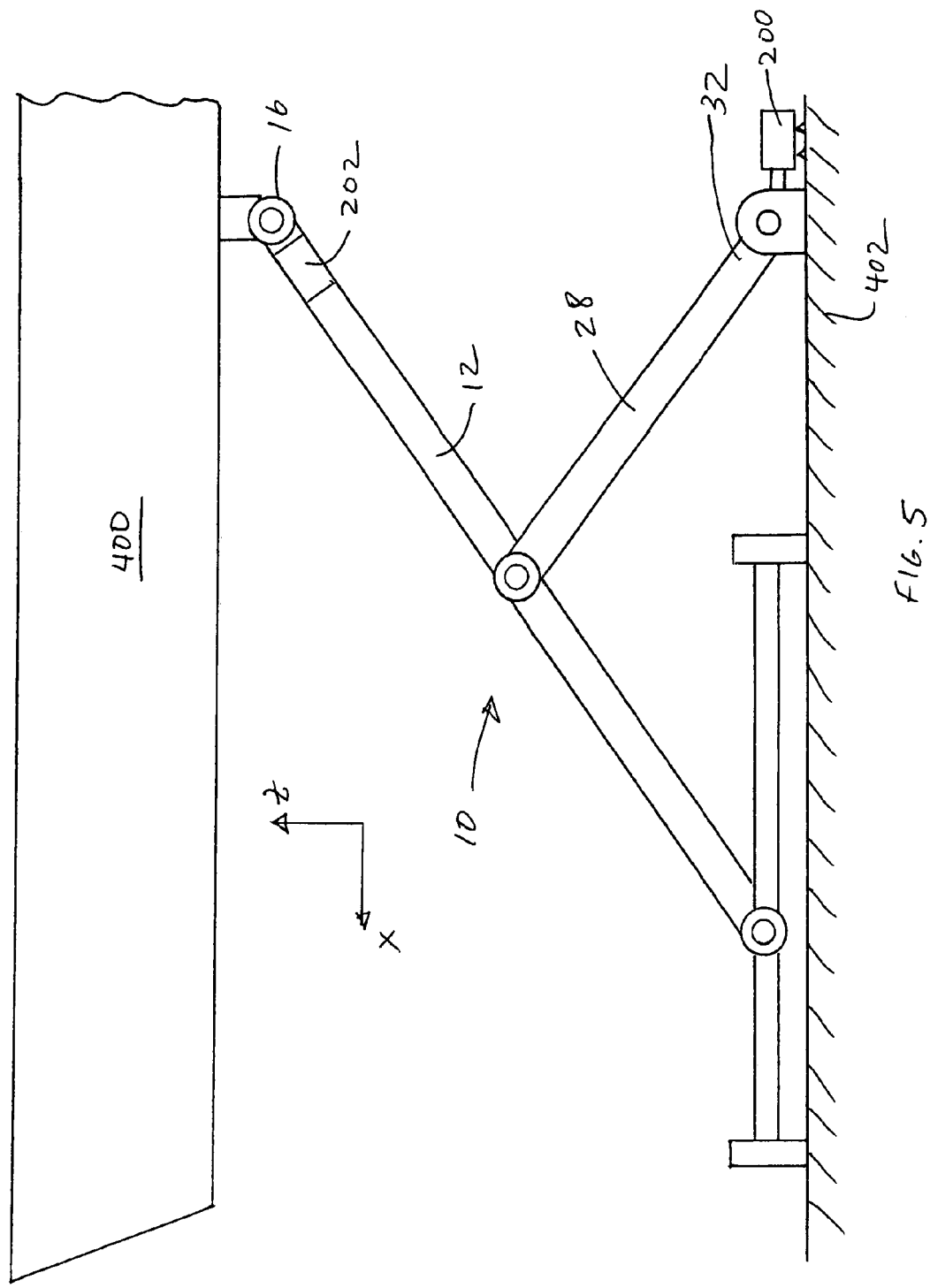
FIG. 5 shows a view of the mount system of FIG. 1 along an X plane in a partially extended position.

FIG. 5 shows the mount system 10 in a partially extended position, where the distal end 16 extends and retracts in a perpendicular manner relative to the wall 402. In this example, the first motor 200 may be mechanically coupled to the proximal end 32 of the second arm 28 to extend and retract the first arm 12. The second motor 202 may be provide on the distal end 16 to pivot the monitor 400 along the XZ plane.

Figure 6:
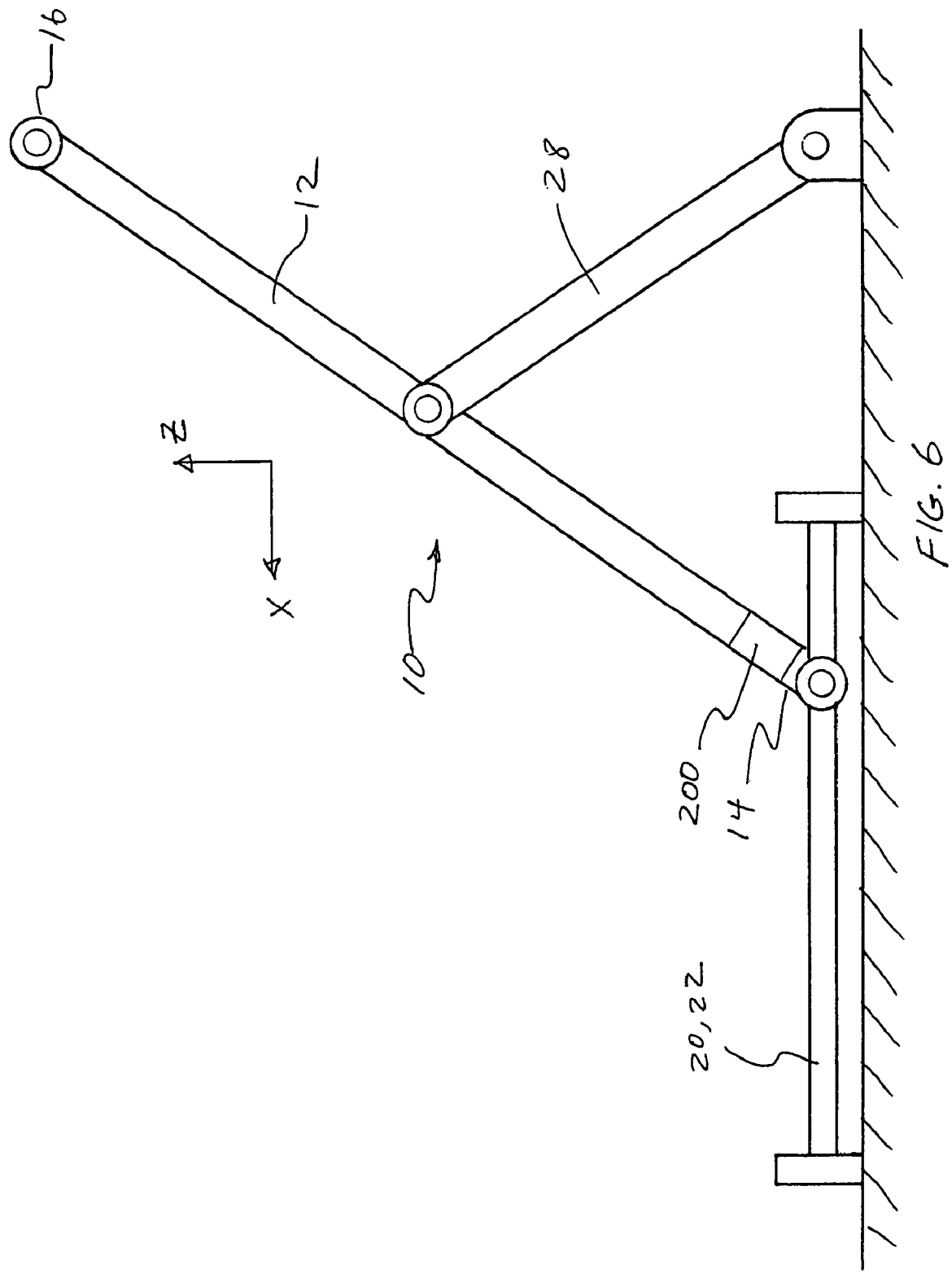
FIG. 6 shows a view of the mount system of FIG. 1 along an X plane in an extended position.

FIG. 6 shows the mount system 10 in fully extended position. In this example, the first motor 200 may be mechanically coupled to the proximal end 14 of the first arm 12 to move the proximal end 14 along the guiding members 20 and 22, which in turn extends and retracts the first arm 12. Note that the second arm 28 supports the first arm 12 about its midpoint to minimize the distal end 16 from sagging along the −Y direction due to the weigh to of the monitor 400.

FIG. 7 shows the mount system 10 including a control system 700 for adjusting the viewing angle of the monitor. The control system 700 includes a remote control 702 having one or more control buttons 704 to activate the mount system 10 to reposition the monitor. The control buttons 704 may include a left swivel button 706, a right swivel button 708, an extension button 710, and a retraction button 712. Activating one of the buttons 704 causes the remote control 702 to transmit a control signal 714, which is received by a receiver 716. The receiver 716 relays the control signal 714 to a processor 718 to control one or more motors 200 and 202 to extend or retract the first arm 12 and/or swivel the monitor accordingly. For example, an activation of the extension button 710 causes the processor 718 to activate the first motor 200 to extend the first arm 12; and activation of the right swivel button 708 causes the processor 718 to activate the second motor to swivel the monitor to the right side.

The processor 718 may be linked to a memory 720 to store predetermined positions. The remote control 702 may have one or more preset buttons 722 and 724 such that activation of one of these buttons cause the processor 718 to activate one or more motors 200 and 202 to reposition the monitor to one of the predetermined positions stored in the memory 720.

Figure 8:
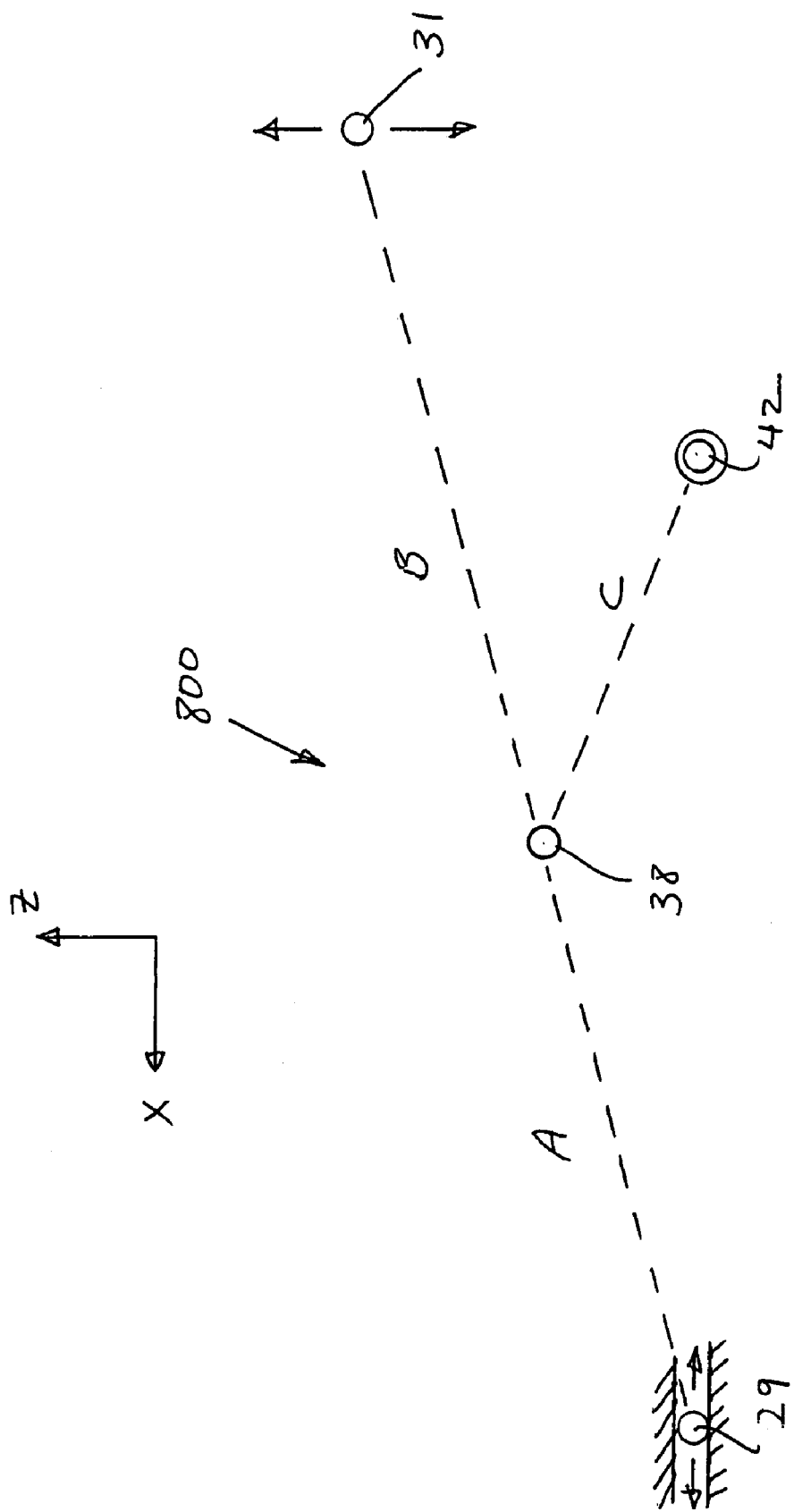
FIG. 8 shows a schematic diagram representing the pivot axes of the mount system.

FIG. 8 shows a schematic diagram 800 representing the relationship amongst the first, second, third, and fourth pivot axes of the mount system 10 along the XZ plane. The schematic diagram 800 shows the first pivot axis 29 adapted to move along the X-axis aligned with the position of the third pivot axis 42, the second pivot axis 31 free to move substantially along the Z-axis; the third pivot axis 42 adapted to rotate in that fixed position; and the fourth pivot axis 38 between the first and second axes 29 and 31. A variable "A" may represent the distance between the first and fourth pivot axes 29 and 38; variable "B" may represent the distance between the fourth and second pivot axes 38 and 31; and variable "C" may represent the distance between the third and fourth pivot axes 42 and 38. In order for the second pivot axis 31 to move substantially along the Z-axis, as the first pivot axis moves along the X-axis, the variables A, B, and C may have the following relationship, where $C^2 = A \times B$. In the example described above the distances A, B, and C are equal to each other (A=B=C), however, other variable lengths may be used in accordance with the relationship discussed above.

Figure 9:
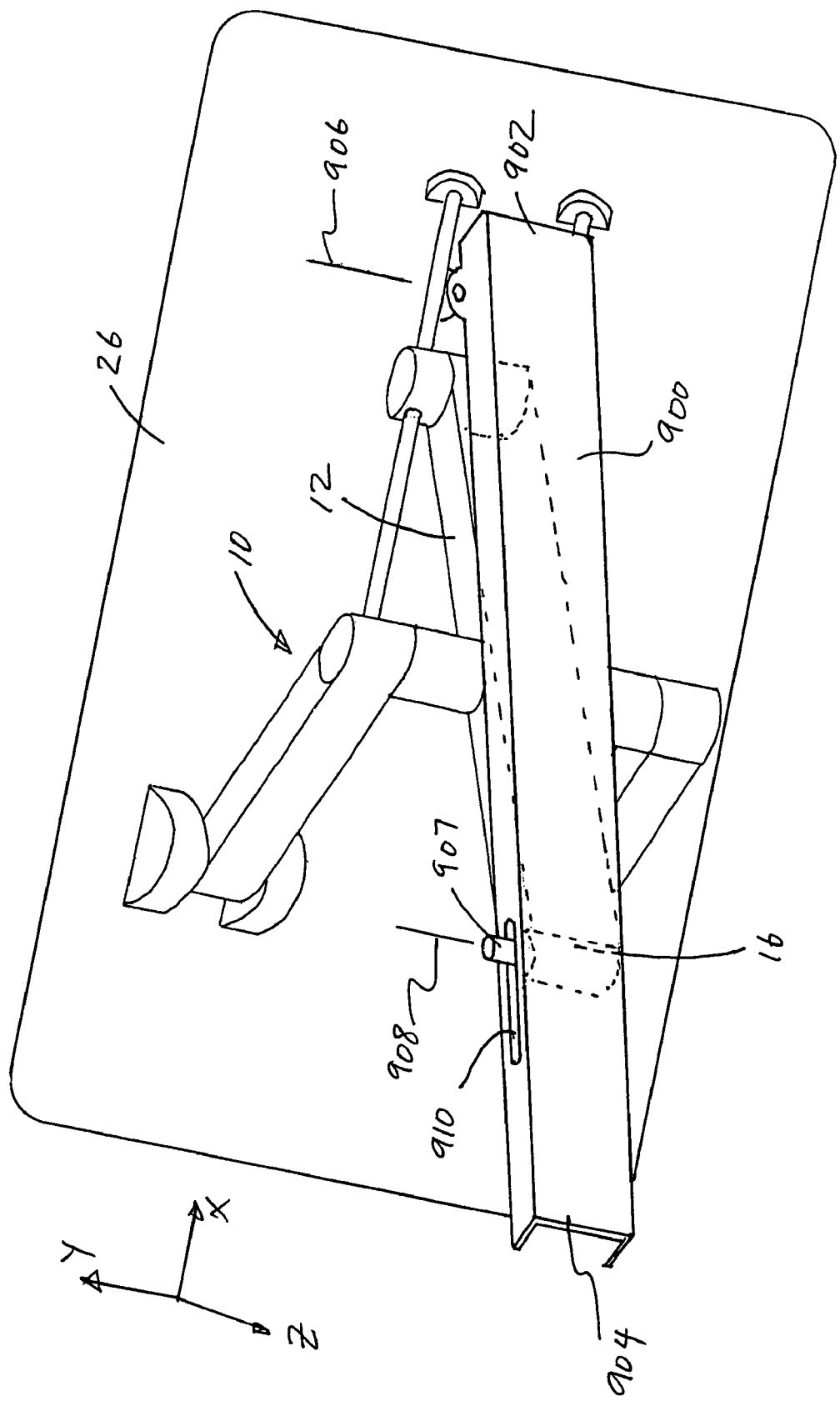
FIG. 9 shows a perspective view of a mount system with a bracket adapted to couple to the back side of a monitor in reference to X, Y, and Z coordinates.

FIG. 9 shows a mount system 10 in a partially extended position relative to the base plate 26 in reference to X, Y, and Z coordinates. The mount system 10 includes a bracket 900 adapted to couple to the back side of a monitor. The bracket 900 has a proximal end 902 and a distal end 904. The proximal end 902 of the bracket 900 may be adapted to pivotably couple to the base plate 206 about a pivot axis 906, which is substantially parallel with the Y-axis. A pin 907 may be used to pivotably couple the distal end 16 of the first arm 12 to the bracket 900 about a pivot axis 908. The pin 907 may be located between the proximal end 902 and the distal end 904. In general, the longitudinal axis of the pin 907 may define the pivot axis 908 and the pin may be closer to the distal end 904 thank the proximal end 902. The bracket 902 may have an opening 910 that is elongated along the longitudinal axis of the bracket 900.

Figure 10:
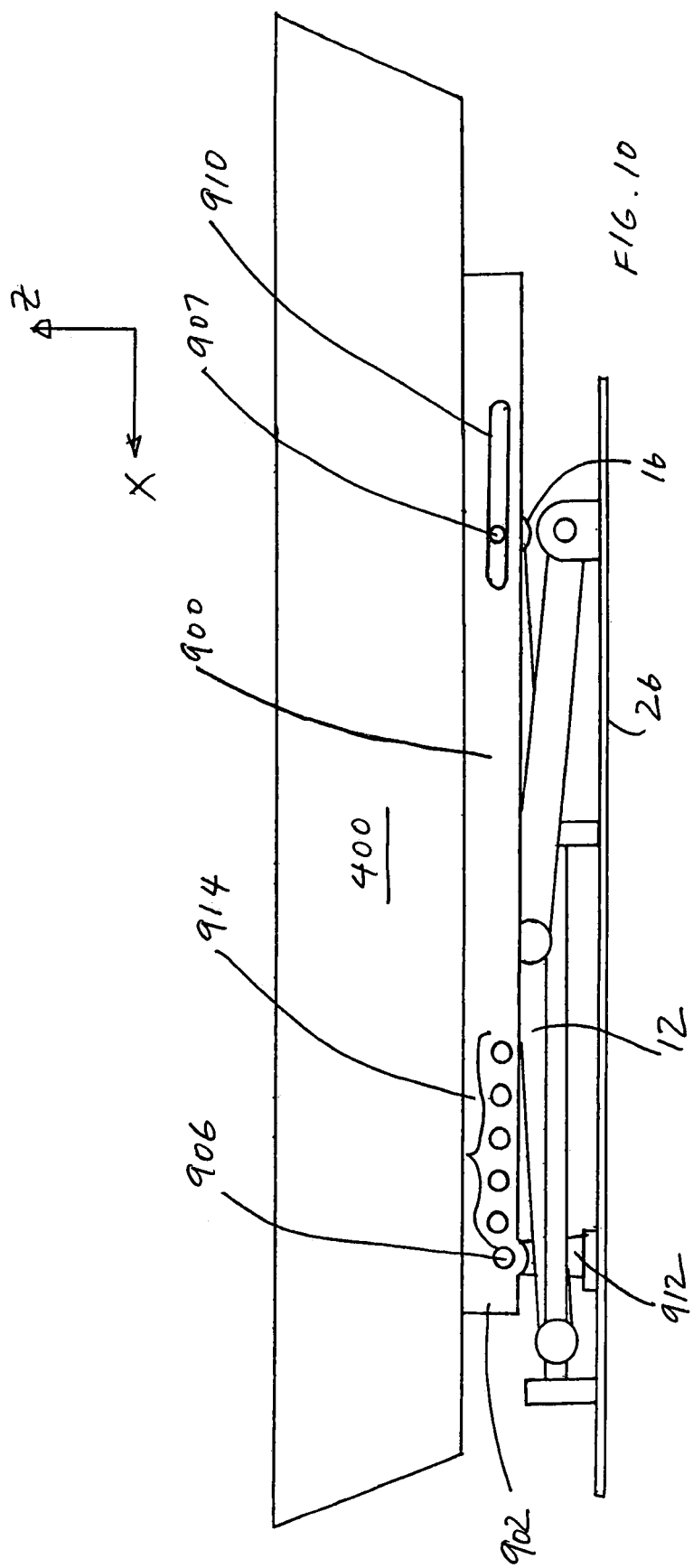
FIG. 10 shows the mount system of FIG. 9 in a partially extended position along the XZ plane.
Figure 11:
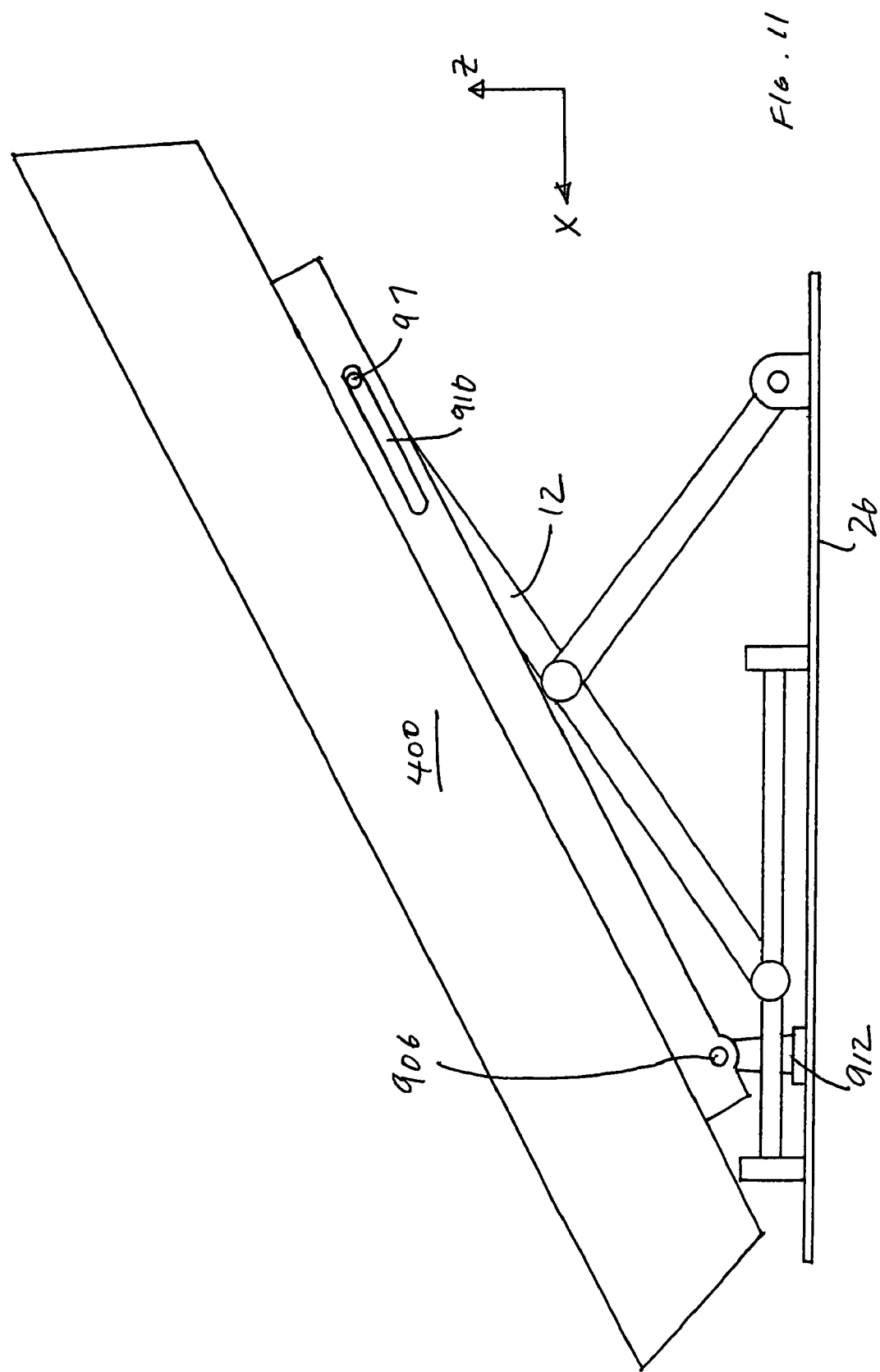
FIG. 11 shows the mount system of FIG. 9 in a retracted position along the XZ plane.

FIGS. 10 and 11 show the mount system 10 described above in reference FIG. 9 in a retracted position and an extended position, respectively. FIGS. 10 and 11 show that as the distal end 16 of the first arm 12 extends and retracts relative to the base plate 26, the pin 907 may move or slide along the elongated opening 910. FIG. 10 shows that a hinge bracket 912 may be used to pivotably couple the proximal end 902 of the bracket 900 about the pivot axis 906. The hinge bracket 912 may be adapted to pivotably couple the proximal end 902 of the bracket 900 so that the monitor 400 is substantially parallel with the base plate 26 when the distal end 16 of the first arm 12 is in the retracted position. In particular, the hinge bracket 912 may be adapted to pivotably couple the proximal end 902 of the bracket 900 so that the bracket 900 is substantially parallel with the base plate 26 when the distal end 16 of the first arm 12 is in the retracted position. FIG. 10 shows that the bracket 900 may have a plurality holes 914 along the longitudinal axis of the bracket 900 adapted to pivotably couple to the hinge bracket 912 to vary the pivot angle between the monitor 400 and the base plate 26. The hinge bracket 912 may be coupled to the base plate 26 along the longitudinal axis of the bracket 900 to correspond with one of the holes 914 being pivotably coupled to the base plate 26.

Figure 12:
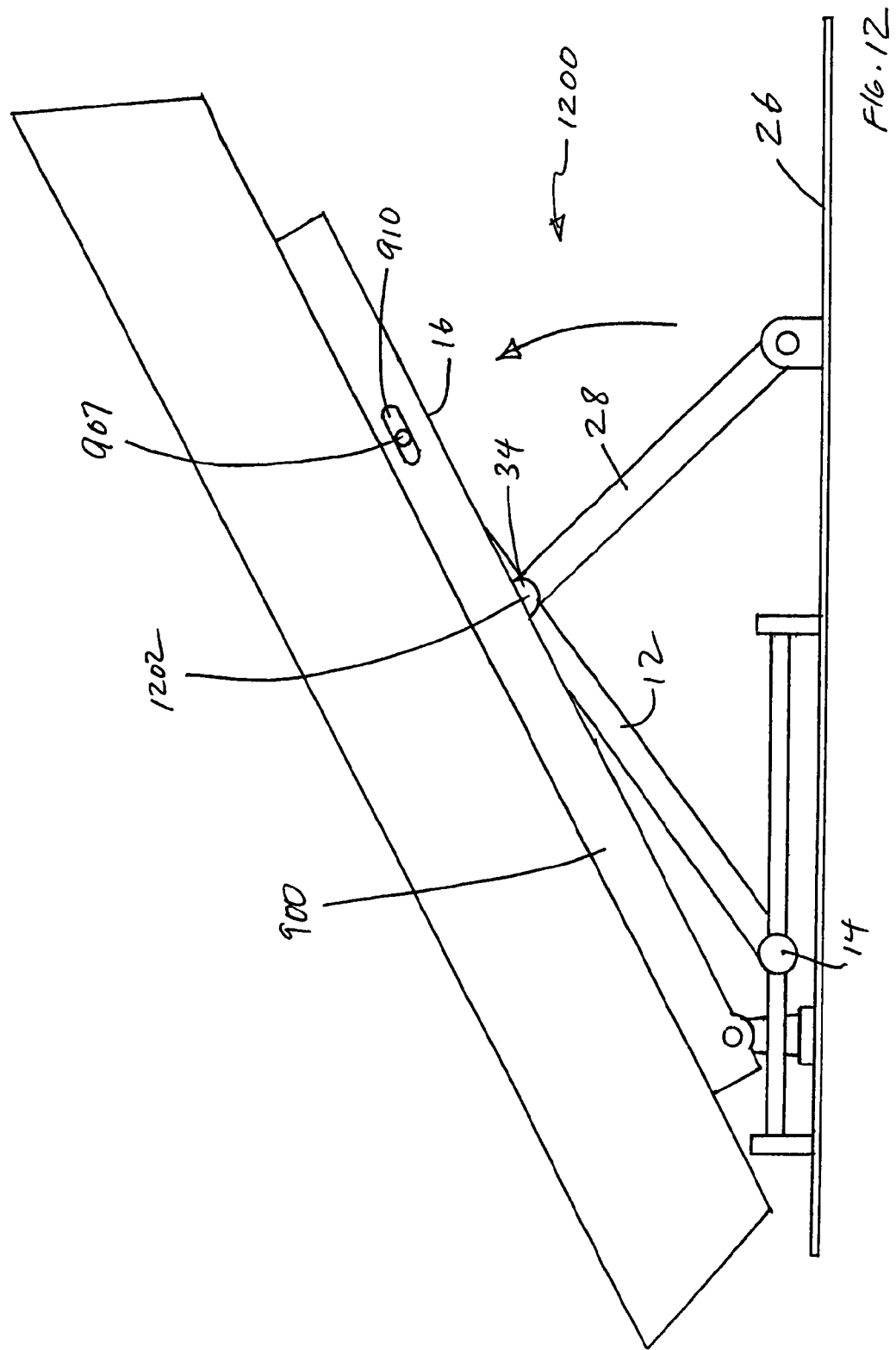
FIG. 12 shows another mount system.

FIG. 12 shows a mount system 1200 similar to the mount system 10 described above in reference to FIG. 9; however, the distal end 16 of the first arm 12 may be adapted to rotate in an arcing manner relative to the base plate 26. In order to extend and retract the distal end 16 in an arcing manner, the distal end 34 of the second arm 28 may be pivotably coupled to the first arm 12 about a pivot axis 1202 that is closer to the distal end 16 than the proximal end 14 of the first arm 16. With the distal end 16 extending and retracting in an arcing manner, the pin 907 may travel less along the longitudinal axis of the bracket 900 as the distal end 16 extend and retracts relative to the base plate 26 so that the length of the elongated opening 910 may be minimized.

Figure 13:
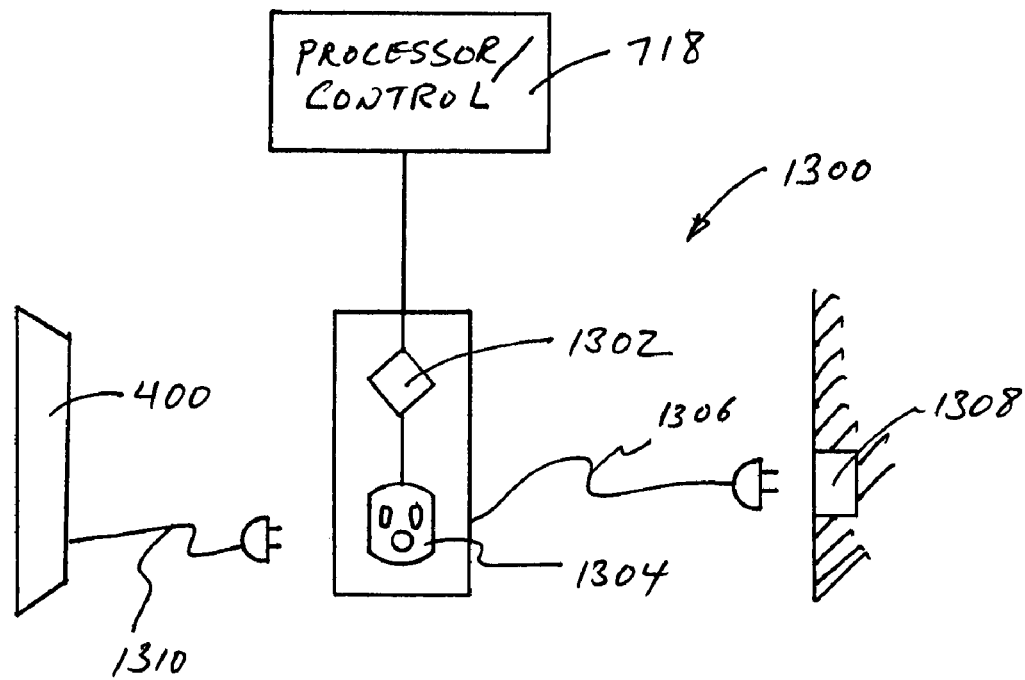
FIG. 13 shows a control block diagram adapted to detect whether the monitor is on or off.

FIG. 13 is a control block diagram 1300 where the processor 718 may detect whether the monitor 400 is turned on or off to automatically extend the monitor 400 if the monitor is turned on, and retract the monitor 400 if the monitor is turned off. The control block diagram 1300 includes a current sensor 1302 electrically coupled to an electrical outlet 1304. The current sensor 1302 may detect whether current is being drawn through the electrical outlet 1304 or not. The electrical outlet 1304 is provided with a power cord 1306 to connect to an external electrical outlet 1308 such as from a home's wall electrical outlet. As such, the control block diagram 1300 of a motorized mount system may provide the electrical outlet 1304 so that the power cord 1310 of the monitor 400 may be connected to the electrical outlet 1304 rather than to the electrical outlet 1308 of the home.

The control block diagram 1300 allows the processor 718 to detect whether the monitor 400 is turned on or off by detecting whether current or power is drawn through the electrical outlet 1304 or not because when the monitor 400 is on, the monitor 400 draws current or power from the electrical outlet 1304, but when the monitor is turned off, then the monitor stops drawing current from the electrical outlet 1304. If the processor 718 detects that the monitor 400 is on, then the control 718 may extend the monitor 400 to a predetermined extended position, but when the monitor 400 is off, then the control 718 may retract the monitor 400 to a predetermined retracted position. Accordingly, as a viewer turns on the monitor 400, and the motorized mount system may automatically extend the monitor 400 to a desired predetermined extended position without having to separately activating the motorized mount system to extend the monitor 400, and when the viewer turns off the monitor 400, the motorized mount system automatically retracts the monitor 400 to the predetermined retracted position.

Figure 14:
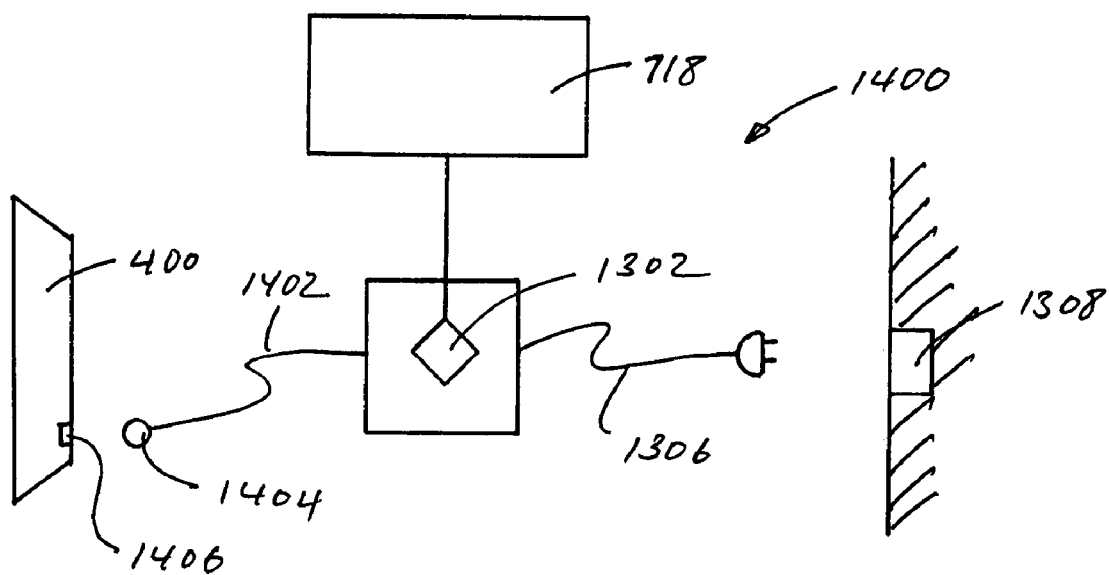
FIG. 14 shows another control block diagram adapted to detect whether the monitor is on or off.

FIG. 14 shows a control block diagram 1400 adapted to automatically extend and retract the monitor when it is on and off, respectively, without having to separately turn on or off the motorized mount system. The processor 718 may be adapted to communicably link to the current sensor 1302 that is provided with the power cord 1306 and a monitor power cord 1402. The power cord 1306 is adapted to connect to the home's electrical outlet 1308. The distal end or female end 1404 of the monitor power cord 1402 is adapted to connect to the electrical connection point 1406 of the monitor 400. As such, rather than using the power cord 1310 provided with the monitor 400, the monitor power cord 1402 may be used to connect to the monitor 400 so that the current sensor 1302 may detect whether the monitor is on or not.

Figure 15:
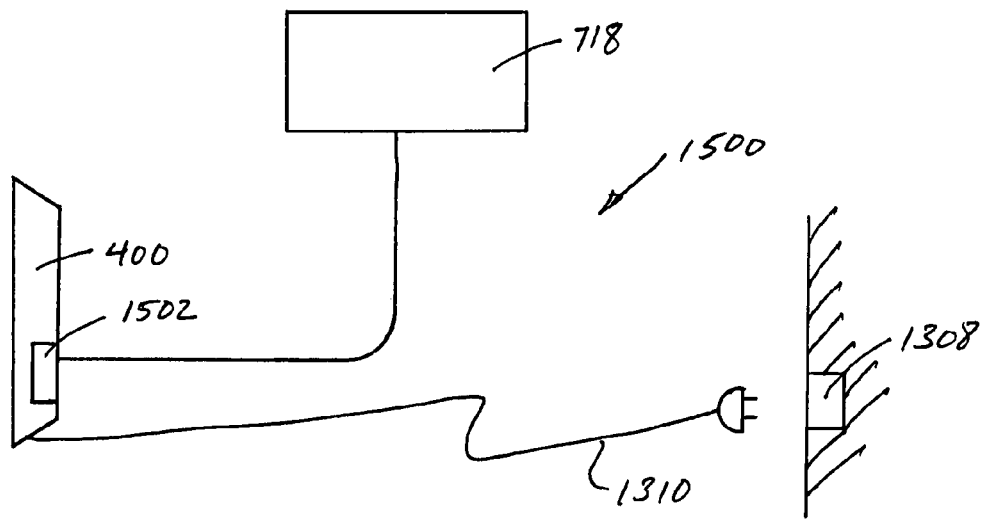
FIG. 15 shows yet another control block diagram adapted to detect whether the monitor is on or off.

FIG. 15 shows a control block diagram 1500 where the processor 718 may be adapted to communicably link to the data output interfaces 1502 of the monitor 400. The power cord 1310 may be connected directly to the electrical outlet 1308 of the home. Most monitors provide video and/or audio outputs to drive external devices such as speakers and other monitors or a service output to diagnose or trouble shoot the monitor. In general, the monitors provide output data such as video and audio signals through their respective video and/or audio output interfaces 1502 when the monitor 400 is only on. The processor 718 may be communicably linked to one or more of the output interfaces 1502 to determine if output signals are provided to determine if the monitor 400 is turned on or off, and extend and retract the monitor 400 accordingly. For instance, if the processor 718 detects that the monitor is on, then the mount system may tilt the monitor down to a predetermined tilt position or swivel the monitor to either left or right side. Note that besides video and audio output interfaces, the control may be communicably linked to RS-232 interface of the monitor to determine whether the monitor is on or off. As another example, if the monitor is provided with a digital optical audio output where the LED light is on when the monitor is on and the LED light is off when the monitor is off, the control circuit may detect for the audio signal or for the presence of LED light from the digital optical audio output to determine if the monitor is on or off, and extend and retract the monitor accordingly.

Figure 16:
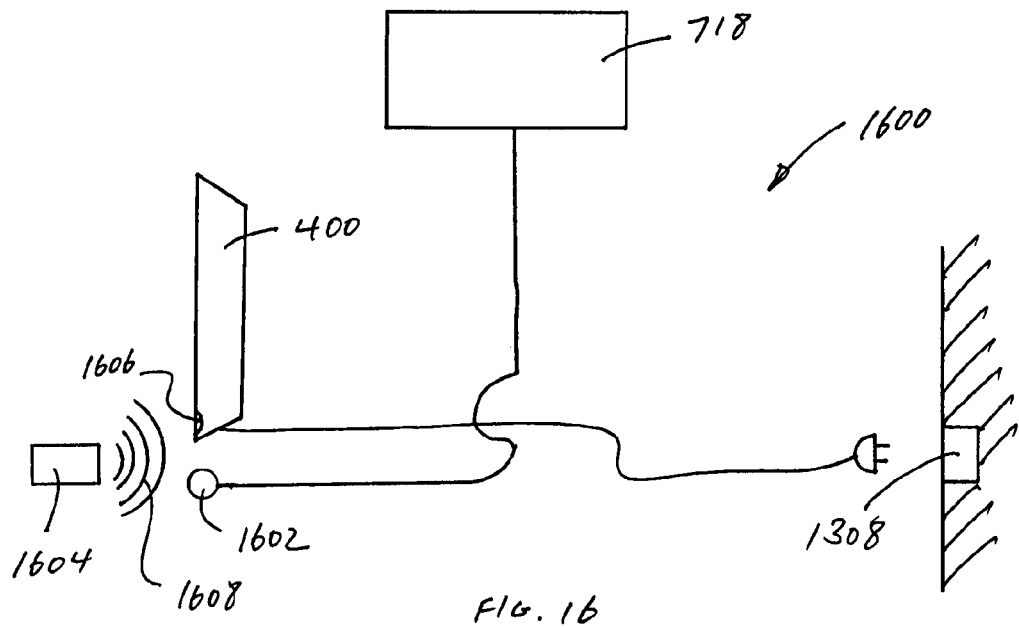
FIG. 16 shows still another control block diagram adapted to detect whether the monitor is on or off.

FIG. 16 shows a control block diagram 1600 where the processor 718 is adapted to communicably link to a receiver 1602 adapted to receive a remote signal from a remote control 1604. The monitor 400 also has a monitor receiver 1606 adapted to receive remote control signal from the remote control 1604. The remote control 1604 may transmit an on/off signal 1608 to the monitor receiver 1606 to turn on or off the monitor accordingly. The receiver 1602 may be positioned near the monitor receiver 1606 to receive the same on/off signal 1608 from the remote control 1604. The processor 718 may be adapted to detect for the on/off signal 1608 from the remote control 1604, and based on the on/off signal 1608, the mount system may tilt or swivel the monitor accordingly. The processor 718 may be provided or programmed with a number of control signals for different brands of monitors. A user may select from a list of monitors so that the processor 718 can detect for a particular on/off signal from the remote control to correspondingly detect whether the monitor is being turned on or off so that the monitor can be tilted or retracted accordingly.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method of detecting whether a monitor is on or off, the monitor having an audio output interface, where the monitor outputs audio signals through the audio output interface when the monitor is on, and the monitor stops outputting the audio signals through the audio output interface when the monitor is off, the method comprising:
    detecting whether audio signals are outputted through an audio output interface of the monitor or not;
    determining that the monitor is turned on if the audio signals are detected through the audio output interface;
    determining that the monitor is turned off if the audio signals are not detected through the audio output interface; and
    activating a motorized mount system adapted to couple to the monitor to move the monitor depending on whether the monitor is on or off.

2. A method according to claim 1, where the audio output interface is a digital optical audio output in form of a light such that the light is off when the monitor is off, and the light is on when the monitor is on, and the step of detecting detects whether the light is on or off to determine whether the monitor is on or off.

3. The method according to claim 1, including extending the monitor from a predetermined retracted position to a predetermined extended position if the step of determining detects that the monitor is on.

4. The method according to claim 1, including retracting the monitor from a predetermined extended position to a predetermined retracted position if the step of determining detects that the monitor is off.

5. The method according to claim 1, including tilting the monitor if the step of determining detects that the monitor is on and retracting the monitor if the step of determining detects that the monitor is off.

6. A method of detecting whether a monitor is on or off, the monitor having an audio output interface, where the monitor outputs audio signals through the audio output interface when the monitor is on, and the monitor stops outputting the audio signals through the audio output interface when the monitor is off, the method comprising:
    detecting whether audio signals are outputted through an audio output interface of the monitor or not, where the audio output interface is a digital optical audio output in form of a light such that the light is off when the monitor is off, and the light is on when the monitor is on, and the step of detecting detects whether the light is on or off to determine whether the monitor is on or off;
    determining that the monitor is turned on if the audio signals are detected through the audio output interface; and
    determining that the monitor is turned off if the audio signals are not detected through the audio output interface.

7. A method of detecting whether a monitor is on or off, the monitor having an audio output interface, where the monitor outputs audio signals through the audio output interface when the monitor is on, and the monitor stops outputting the audio signals through the audio output interface when the monitor is off, the method comprising:
    detecting whether audio signals are outputted through an audio output interface of the monitor or not;
    determining that the monitor is turned on if the audio signals are detected through the audio output interface;
    determining that the monitor is turned off if the audio signals are not detected through the audio output interface; and
    extending the monitor from a predetermined retracted position to a predetermined extended position if the step of determining detects that the monitor is on.

8. The method according to claim 7, including retracting the monitor from the predetermined extended position to a predetermined retracted position if the step of determining detects that the monitor is off.

9. The method according to claim 7, where the step of extending is tilting the monitor if the step of determining detects that the monitor is on, and retracting the monitor if the step of determining detects that the monitor is off.

* * * * *